US012705607B2

(12) United States Patent
Higgins et al.

(10) Patent No.: US 12,705,607 B2
(45) **Date of Patent: *Aug. 11, 2026**

(54) DISTRIBUTED LEDGER SYSTEMS, METHODS AND DEVICES

(71) Applicant: Christopher Lyndon Higgins, Noosa Heads (AU)

(72) Inventors: Christopher Lyndon Higgins, Noosa Heads (AU); Nicholas David Beaugeard, New South Wales (AU); Lyndon Hamilton Higgins, New South Wales (AU)

(73) Assignee: Christopher Lyndon Higgins, Noosa Heads (AU)

( * ) Notice: Subject to any disclaimer, the term of this patent is extended or adjusted under 35 U.S.C. 154(b) by 26 days.

This patent is subject to a terminal disclaimer.

(21) Appl. No.: 18/927,826

(22) Filed: Oct. 25, 2024

(65) Prior Publication Data

US 2025/0053967 A1 Feb. 13, 2025

Related U.S. Application Data

(63) Continuation of application No. 17/294,405, filed as application No. PCT/IB2019/059902 on Nov. 18, 2019, now Pat. No. 12,131,318.

(30) Foreign Application Priority Data

Nov. 16, 2018 (AU) ................................ 2018904392
Nov. 19, 2018 (AU) ................................ 2018904396

(51) Int. Cl.
*G06Q 20/38* (2012.01)
*G06Q 20/40* (2012.01)

(52) U.S. Cl.
CPC ... *G06Q 20/3825* (2013.01); *G06Q 20/38215* (2013.01); *G06Q 20/3827* (2013.01); *G06Q 20/4014* (2013.01)

(58) Field of Classification Search
CPC ......... G06Q 20/38215; G06Q 20/3825; G06Q 20/3827; G06Q 20/389; G06Q 20/4014; H04L 9/3236; H04L 9/3239; H04L 9/50
See application file for complete search history.

(56) References Cited

U.S. PATENT DOCUMENTS 11,025,409 B1 * 6/2021 Fields ....................... H04L 9/30
2018/0054491 A1 2/2018 Mankovskii et al.

(Continued)

FOREIGN PATENT DOCUMENTS

| | | |
|---|---|---|
| CN | 107317730 | 11/2017 |
| CN | 107911421 | 4/2018 |
| WO | 2018146373 | 8/2018 |

OTHER PUBLICATIONS

Kim, S. K.: "Measuring Ethereum's Peer-to-Peer Network", Master's Thesis at University of Illinois at Urbana-Champaign, Mar. 13, 2018 (Mar. 13, 2018), XP55707484, Retrieved from the Internet <URL:https://www.ideals.illinois.edu/handle/2142/99409> *.

(Continued)

*Primary Examiner* — Gil H. Lee
(74) *Attorney, Agent, or Firm* — BRYAN CAVE LEIGHTON PAISNER LLP

(57) ABSTRACT

A distributed ledger system configured to create, update and maintain at least one blockchain indicative of transactions performed by a network of users of the system, the system comprising a network of computing devices including a network of user nodes in communication with one another to participate in transactions and subsequently write the transactions to an associated blockchain, each node being associated with at least one processor and at least one computer-readable medium having recorded thereon instructions to be executed by the processor(s) to carry out one or more (Continued)

blockchain-related tasks for creating, updating and/or maintaining at least one associated blockchain of the system based on the transactions; and wherein the network of computing devices is operable to enable at least one ephemeral user node to join the network of computing devices to carry out the blockchain-related tasks in association with at least one blockchain during an active session of the ephemeral user node.

20 Claims, 2 Drawing Sheets

(56) References Cited

U.S. PATENT DOCUMENTS

| | | | | |
|---|---|---|---|---|
| 2018/0198624 | A1 | 7/2018 | Bisti | |
| 2018/0218003 | A1 | 8/2018 | Banga et al. | |
| 2018/0254898 | A1 | 9/2018 | Sprague et al. | |
| 2018/0300382 | A1 | 10/2018 | Madisetti et al. | |
| 2019/0013948 | A1* | 1/2019 | Mercuri | G06Q 20/308 |
| 2019/0065733 | A1* | 2/2019 | Forehand | H04L 9/32 |
| 2019/0303920 | A1* | 10/2019 | Balaraman | H04L 67/1042 |

OTHER PUBLICATIONS

Nakamoto, S., Bitcoin: a Peer-to-Peer Electronic Cash System, Jul. 4, 2010 (Jul. 4, 2010), XP055546007, Retrieved from the Internet <URL:https://web.archive.org/web/20100704213649/http://www.bitcoin.org/bitcoin.pdf> *.

* cited by examiner

DISTRIBUTED LEDGER SYSTEMS, METHODS AND DEVICES

REFERENCE TO PRIOR APPLICATIONS

This application is a continuation of U.S. patent application Ser. No. 17/294,405, filed May 16, 2021 and issued as U.S. Pat. No. 12,131,318 on Oct. 29, 2024; which is a National Stage of International Patent Application No. PCT/IB2019/059902, filed Nov. 18, 2019; which claims priority to Australian Patent Application Nos. 2018904392, filed Nov. 16, 2018 and 2018904396, filed Nov. 19, 2018, each hereby expressly incorporated by reference in its entirety.

FIELD OF THE INVENTION

The invention relates to systems, methods and devices for providing an improved computer architecture for blockchains and to methods and systems for developing efficient blockchain based business solutions.

BACKGROUND ART

Perennial problems exist in prior art in software systems deploying blockchain technology including extended time to execute and complexity of systems necessary to conduct, handle and validate blockchain transactions, and the failure to maximise security conditions in many implementations of blockchain systems because increasing security tends to create overly complex implementations.

According to the Harvard Business Review: https://hbr.org/2017/03/how-safe-are-blockchains-it-depends, blockchains can only be safe if they are operated correctly, including providing multiple operational nodes of the blockchain. Satoshi Nakamoto in the original Bitcoin whitepaper published in October 2008 https://bitcoin.org/bitcoin.odf stated in words to the effect that "a blockchain would be secure as long as there was more computing power operating for vs against the network".

A typical architecture for a system deploying blockchain would be a server-based API communicating with a Single Page application refer Microsoft Magazine: https://docs.microsoft.comien-us/archive/msdn-magazine/2013/november-fasp-net-single-page-applications-build-rnodern-responsive-web-apps-with-asp-net.

This would provide good functionality; however, the server API infrastructure is a potential security weak point.

For systems deploying blockchain elements, security requires as many nodes as can be conveniently created and made active, but increasing numbers of active nodes increases complexity and decreases ease of use, development and maintenance.

On the other hand, optimum conditions for conducting development, operations and maintenance benefit from simplicity of system architecture. Until recently, these key factors 1) simplicity in development, operating and maintaining, compete against 2) security often causing compromise resulting in less than optimum outcomes in both 1) and 2).

For example, communications between parties related by commercial, social, other transactional links or storage of personal information (hereinafter referred to as "Related Parties") and protection of the transactional data and release thereof or discussion about such transactions or release of related personal information (hereinafter referred to as "Customer Data Release") require one or more of the parties involved in said transactions to observe at least a reasonable level of privacy rules that are either self-imposed rules or industry standards or standards imposed or strongly recommended by government agencies to ensure that Customer Data Release only occurs between the Related Parties or their duly authorised representatives.

The rigor in ensuring privacy rules that are observed in Customer Data Release often requires onerous layers of privacy and related identification procedures which consume valuable resources.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide alternative systems, methods and/or devices for overcoming some of the abovementioned problems of the prior art, or to at least provide the public with a useful choice.

SUMMARY OF THE INVENTION

In a first aspect, the invention may broadly be said to consist of a distributed ledger system configured to create, update and maintain at least one blockchain indicative of transactions performed by a network of users of the system, the system comprising:

a network of computing devices including a network of user nodes in communication with one another to participate in transactions and subsequently write the transactions to an associated blockchain, each node being associated with at least one processor and at least one computer-readable medium having recorded thereon instructions to be executed by the processor(s) to carry out one or more blockchain-related tasks for creating, updating and/or maintaining at least one associated blockchain of the system based on the transactions; and wherein the network of computing devices is operable to enable at least one ephemeral user node to join the network of computing devices to carry out the blockchain-related tasks in association with at least one blockchain during an active session of the ephemeral user node.

Preferably the network of computing devices is operable to enable at least one ephemeral user node to repeatedly join the network of computing devices to carry out the blockchain-related tasks in association with at least one blockchain during multiple active sessions.

Preferably each node is configured to obtain executable code from the associated computer-readable medium to perform the one or more blockchain-related tasks.

Preferably at least one node is configured to communicate with the network of computing devices to obtain the executable code using an address location within a blockchain of the system.

Preferably the node is configured to access and execute the blockchain-related tasks via a web instance operable using the processor(s) associated with the node. The web instance may be a web-browser instance.

Preferably the node is configured to access and execute the blockchain-related tasks using a web Assembly container.

Preferably the node is an ephemeral node.

Preferably the node joins the network of computing devices when the node is capable of communicating with the server to access and perform one or more blockchain related tasks.

Preferably all nodes are ephemeral nodes.

Preferably at least one node is configured to obtain data indicative of a current iteration of a blockchain from corresponding peer nodes for enabling the execution of the blockchain-related task(s).

Preferably at least one node is configured to obtain data indicative of a most recent block or most recent blocks of a current iteration of a blockchain from the network of computing devices for enabling the execution of the blockchain-related task(s).

Preferably each ephemeral node is configured to obtain data indicative of a most recent block or most recent blocks of a current iteration of a blockchain when the node joins the network of computing devices for enabling the execution of the blockchain-related task(s).

Preferably at least one ephemeral node is configured to maintain a full copy of the blockchain.

Preferably multiple ephemeral nodes of the network are configured to maintain a full copy of the blockchain.

Preferably the network of ephemeral nodes comprises at least one node operating as a full-node, wherein the full-node is operable to execute a mining task of the blockchain-related tasks for selecting a node within the network to write a next validated block to the blockchain.

Preferably the mining task is operative using a proof-of-stake method.

Preferably wherein the network of nodes comprises at least one ephemeral node operating as a light node, wherein the light node is not operable to execute a mining task of the blockchain-related tasks.

Preferably the network of nodes is capable of communicating with one another via a peer-to-peer communications protocol.

Preferably the peer-to-peer communication is facilitated by webRTC.

Preferably the network of computing devices is configured to verify a predetermined user identity associated with a node prior to the node establishing communication with the remaining network of nodes for the purposes of carrying out one or more blockchain-related tasks.

Preferably verifying the predetermined user identity comprises a two-factor authentication process.

Preferably the two-factor authentication process includes a biometric identification stage wherein a predetermined biometric characteristic of a user associated with the user node is verified.

Preferably each node in the network of nodes comprises a node address associated therewith for each blockchain the node is configured to participate in to enable communication with the node, and wherein the node address includes an indication of the associated blockchain.

Preferably the node address is temporary for an ephemeral node.

Preferably an ephemeral node receives a new node address different to a previous node address for an associated blockchain when the node re-joins the network of nodes.

Preferably wherein each node comprises a unique node address for each blockchain associated with a user (or "a user node").

Preferably wherein the network of computing devices is configured to associate a pair of public and private keys to a user address associated with the user's node for use in encrypting and decrypting transactions associated with a blockchain upon the associated node joining the network for the purposes of participating in the blockchain.

Preferably the network of computing devices is operable to create, update and maintain multiple blockchains.

Preferably each user node is associated with a user identification and wherein the user identification is utilised in transactions associated with the user node to identity the associated user, Preferably the one or more transactions comprises the exchange of data between at least two computing devices including any combination of one or more of: text data, image data, audio data and/or video data.

Preferably the network of nodes comprises at least one group of nodes associated with a user identity, and wherein each group of nodes comprises at least one node having a parent user address associated with that user node and one or more child user addresses each associated with a node and having a child user address that includes data indicative of the associated parent node user address.

Preferably at least one group of nodes and associated user addresses is operative to require authorisation of a transaction from one or more user addresses associated with users of nodes within the group of nodes prior to broadcasting the transaction for writing into the associated blockchain.

Preferably each authorising node is associated with at least one parent or related child user addresses.

Preferably the network of computing devices is configured to allocate a static user identify to each network node upon joining the network for the first time.

Preferably the network of computing devices is configured to allocate a new virtual user identity differing from the static user identify to each ephemeral node every time the node rejoins the network of computing devices.

Preferably the network of computing devices is configured to allocate a new virtual user identity to each ephemeral node every time the node rejoins the network of computing devices, wherein the new virtual user identify differs from a previously allocated virtual user identity.

Preferably the network of computing devices is configured to allocate a new virtual user identity differing from the static user identity to each node for every transaction associated with the node.

In a second aspect, the invention may broadly be said to consist of a method for maintaining at least one blockchain stored in a distributed ledger system, the method comprising:

- enabling communication between a network of computing devices including a network of user nodes of the system, to enable execution of one or more transactions between multiple user nodes and to enable writing of the transaction(s) to an associated blockchain,
- providing an interface for the network of computing devices to access at least one computer-readable medium having recorded thereon instructions to carry out one or more blockchain-related tasks for creating, updating and/or maintaining at least one associated blockchain of the system based on the transactions, and to allow each computing device to execute the blockchain-related tasks; and
- enabling at least one ephemeral user node to join the network of computing devices and to access the at least on computer-readable medium to execute the blockchain-related tasks in association with at least one blockchain during an active session of the ephemeral user node.

Preferably the method further comprises enabling at least one ephemeral user node to repeatedly join the network of computing devices during different active sessions.

Preferably the interface is accessible via a web instance executed by the respective computing device.

Preferably at least one node is configured to communicate with the network of computing devices to obtain the executable code using an address location within a blockchain of the system.

Preferably the node is an ephemeral node.

Preferably all user nodes are ephemeral nodes.

Preferably the method further comprises providing at least one node with data indicative of an instance of a blockchain from the network of computing devices for enabling the execution of the blockchain-related task(s).

Preferably the method further comprises providing at least one node with data indicative of a most recent block or most recent blocks of an instance of a blockchain from the network of computing devices for enabling the execution of the blockchain-related task(s).

Preferably the method further comprises providing each ephemeral node with a data indicative of an instance of the blockchain when the node joins the network of computing devices for enabling the execution of the blockchain-related task(s).

Preferably at least one ephemeral node is configured to maintain a full copy of an instance of the blockchain.

Preferably multiple ephemeral nodes of the network are configured to maintain a full copy of an instance of the blockchain.

Preferably the method further comprises enabling at least one ephemeral node to operate as a full-node to execute a mining task of the blockchain-related tasks for selecting a node within the network to write a next validated block to the blockchain.

Preferably the mining task is operative using a proof-of-stake method.

Preferably the method further comprises enabling at least one ephemeral node to operate as a light node, wherein the light node is not operable to execute a mining task of the blockchain-related tasks.

Preferably the method further comprises enabling the network of nodes to communicate with one another via a peer-to-peer communications protocol.

Preferably the peer-to-peer communication is facilitated by webRTC.

Preferably the method further comprises performing a user verification prior to providing a user node with access to the blockchain-related tasks.

Preferably the user verification comprises a two-factor authentication process.

Preferably the two-factor authentication process includes a biometric identification stage wherein a predetermined biometric characteristic of a user associated with the user node is verified.

Preferably the method further comprises allocating each node in the network with a node address for each blockchain the node is configured to participate in.

Preferably the node address is temporary for an ephemeral node.

Preferably the method further comprises allocating a new node address different to a previous node address when an ephemeral node re-joins the network of nodes.

Preferably the method further comprises allocating each node with a unique node address for each blockchain associated with the one or more user addresses associated with the node.

Preferably the method further comprises allocating a pair of public and private keys associated with each user address associated with the user node for use in encrypting and decrypting transactions upon a node joining the network.

Preferably the blockchain-related tasks are executable by the network of computing devices to create, update and maintain multiple blockchains.

Preferably the method further comprises allocating a user identification addresses for a user associated with a user node to be utilised in transactions associated with the user node.

Preferably the one or more transactions comprises the exchange of data between at least two computing devices including any combination of one or more of: text data, image data, audio data and/or video data.

Preferably the method further comprises enabling a group of network nodes to join the network of nodes, and wherein the group of network nodes comprises at least one node having a parent user address and one or more nodes associated with child user addresses that includes data indicative of the associated parent user address.

Preferably the method further comprises operating at least one group of nodes to require authorisation of a transaction from one or more Parent and child user addresses associated with nodes within the group of nodes prior to broadcasting the transaction for writing into the associated blockchain.

Preferably each authorising node is associated with at least a parent or a related child user address.

Preferably the method further comprises enabling the allocation of a static user identify to each network node upon joining the network for the first time.

Preferably the method further comprises enabling the allocation of a new virtual user identity differing from the static user identify to each ephemeral node every time the node rejoins the network of computing devices.

Preferably the method further comprises enabling the allocation of a new virtual user identity to each ephemeral node every time the node rejoins the network of computing devices, wherein the new virtual user identify differs from a previously allocated virtual user identity.

Preferably the method further comprises enabling the allocation of a new virtual user identity differing from the static user identity to each node for every transaction associated with the node.

In another aspect, the invention may broadly be said to consist of a system of computer software and devices configured to enable a blockchain transaction system, said system comprising;

one or more Application Programmable Interface (API) server instances containing or connected to a synchronously operating fully operational blockchain node and having other connections so as to be able to communicate with at least two persistent and any number of ephemera€ synchronously operating fully operational blockchain nodes of a blockchain and connected to be in communication with one or more SQL Database systems;

at least one user device capable of running, as a web instance or in a web browser, an Application containing or connected to a synchronously operating fully operational blockchain node, connected to said API server and others of synchronously operating fully operational blockchain nodes on others of user devices;

one or more SQL Databases connected to said API server; said SQL Database, API server and at least one associated synchronously operating fully operational persistent blockchain node are preferably hosted on a public cloud computing services.

In another aspect, the invention may broadly be said to consist of a system of secure communications between any two or more of parties interacting together on account of commercial or social transactions, said system comprising;

one or more API servers instances containing or connected to a synchronously operating fully operational blockchain node and having other connections so as to be able to communicate with at least two persistent and any number of ephemeral synchronously operating fully operational blockchain nodes of a blockchain and connected to be in communication with one or more SQL Database systems;

at least two user devices capable of running a web instance of an application, collectively requiring two factor authorisation by users of the user devices, and said web instance App containing or connected to a synchronously operating fully operational blockchain node, connected to said API server and others of synchronously operating fully operational blockchain nodes on others of the user devices;

one or more SQL Databases connected to said API server; said SQL Database, API server and at least one associated synchronously operating fully operational persistent blockchain node are preferably hosted on a public cloud computing service.

In another aspect the invention may broadly be said to consist of a method of transacting data between two devices comprising establishing at least one communication link capable of transmitting and recording secure voice and or video and or images or text between web instances of an App containing or connected to a synchronously operating fully operational blockchain node whereby the users are capable of exchanging data only after a two factor identity verification is performed on the users.

In another aspect the invention may broadly be said to consist of a distributed ledger system comprising a system of child or sub identities or sub nodes in a blockchain so the sub identities are also able to access the links to other nodes or sub nodes of the blockchain thereby allowing multiple specific persons/entities to be each authorized to a specific sub identity of a user node or sub node to utilize the communication links to any other node such that the calling person and the call receiving person have certainty with whom it is that they are in communication.

In another aspect the invention may broadly be said to consist of a method of operating a distributed ledger system for one or more blockchains, comprising:

creating and or deploying software for any one or all of the following such that together the following may communicate as necessary to implement proper and secure operation of a blockchain: one or more API server systems, one or more SQL Database systems, at least one web instance of, or running in a web browser, an application deployable to run on client devices including any mobile or other device capable of running said web instance application containing or connected to a synchronously operating fully operational blockchain node of said blockchain, In another aspect the invention may broadly be said to consist of a method for facilitating communications between any two or more of parties interacting, said method including any combination of one or more of:

creating and or deploying software for any one or all of the following such that together the following may communicate as necessary to implement proper and secure operation of a blockchain, one or more API server systems, one or more SQL Database systems, at least two web instances or web browser instances of an application requiring two-factor authorisation by users, and said web instance App deployable to run on client devices including any mobile or lap top or PC or any other Device capable of running said web instance application containing or connected to a synchronously operating fully operational blockchain node of said blockchain;

connecting or providing connection means of communication between an API server, a SQL Database, a web instance App deployable to run on client devices including any mobile or other Device capable of running said web instance App containing or connected to a synchronously operating fully operational blockchain node of said blockchain and including providing that the nodes contained in or associated with the Apps are able to independently communicate with one another;

providing child or sub identities for any node in the blockchain so as to create a class of sub identities relating to a parent user identity or address associated with a Node on the blockchain said sub identities having access to communicate with any other nodes of the blockchain thereby allowing multiple specific persons to be each authorized to and provided with a persona€ sub identity to utilize the communication links to any other node or to any other sub identity of a node on a blockchain; and/or providing secure voice and or video or image communication and recording of transmissions between web instances of an application containing or connected to a synchronously operating fully operational blockchain node whereby the parties connected are absolutely certain that the identity of the person at least at the customer end has been connected to the system only after 2 Factor identity verification of the user of the device.

In another aspect, the invention may broadly be said to consist of a system of computer software and devices configured so as to enable simpler and more secure blockchain transaction systems, said system configuration comprising;

API servers or server systems which may include distributed server systems of more than one server (API Server) connected with at least two persistent and any number of ephemeral synchronously operating fully operational blockchain nodes and also connected to a SQL Database;

a blockchain constructed so that the data is written in a code which is then compiled and then encrypted before being written to the blockchain, said data including compiled code to run applications;

at least one client mobile or other device including laptops, tablets, PC's or any device capable of running as a web instance, or in a web browser, an Application containing or connected to a synchronously operating fully operational blockchain node, collectively (Devices or Client Device or Devices), connected to said API Server and others of synchronously operating fully operational blockchain nodes (Nodes) on others of client Devices, Preferably a communication link capable of transmitting secure voice and or video or images between web instances of an Application containing or connected to a synchronously operating fully operational blockchain node whereby the parties connected are absolutely certain that there is a high level of trust and security in this system. Preferably a means of communication at least at the Client Device has been connected to the system only after 2 Factor identity verification including one bio-metric verification. Any of said communication(s) transmitted via the link may be recorded in a blockchain;

Preferably, all users/identities (ID or IDs) on this system are peers. Any user/identity/entity of this system having multiple persons/employees/contractors requiring individual and identifiable to the person access to the communication link system as part of, or as an authorised representative of the user, requires a means of authorising and issuing a sub class of identities addresses identifying the individual users who are employees of or contracted to the user. All user identities including Sub User Identities are preferably identified by 2 Factor Auth including 1 biometric identification (ID) method. Such identification of all participants in the communication link is preferably verified from information stored within the system itself as well as by devices running the web instance App.

Preferably a SQL Database system is connected to said API Server; said SQL Database system, API Servers and Nodes are scalable so as to accommodate large numbers of transactions and users instances and preferably are hosted on a public cloud computing service.

Any one or more of the above embodiments or preferred features can be combined with any other embodiment or feature and/or with any one or more of the above aspects.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

In this specification the term "blockchain" is intended to mean a construct of blocks of data connected together using hash pointers and representing a series of transactions performed between users of a peer-to-peer network.

In this specification the term "node" or "user node" is intended to mean a software application which participates in the management of a blockchain.

In this specification the term "wallet" is intended to mean a piece of software which communicates with and proposes blocks for the blockchain.

In this specification, the term "WebAssembly" or the acronym "WASH" refers to a technology whereby common browsers operate a stack based virtual machine that allows common development languages to be compiled for it, such as described in https:/ien.wikipedia.org/wiki/WebAssembly.

In this specification, the term "Blazor" is intended to refer to an experimental framework allowing.Net code to run under WebAssembly, such as described in httos://dotnet.rnicrosoft.comlabosiaspnetiweb-abosiblazor.

In this specification the term "WebRTC" is intended to refer to a proposed standard for peer-to-peer data, voice and video conversations between computers running browsers, such as described in https://en.wikipedia.orn/wiki/WebRTC.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of general-purpose computer system or computing device, including, but not limited to, a desktop, laptop, notebook, tablet or mobile device. The term "mobile device" includes, but is not limited to, a wireless device, a mobile phone, a mobile communication device, a user communication device, personal digital assistant, mobile hand-held computer, a laptop computer, an electronic book reader and reading devices capable of reading electronic contents and/or other types of mobile devices typically carried by individuals and/or having some form of communication capabilities (e.g., wireless, infrared, short-range radio, etc.).

Figure 1:
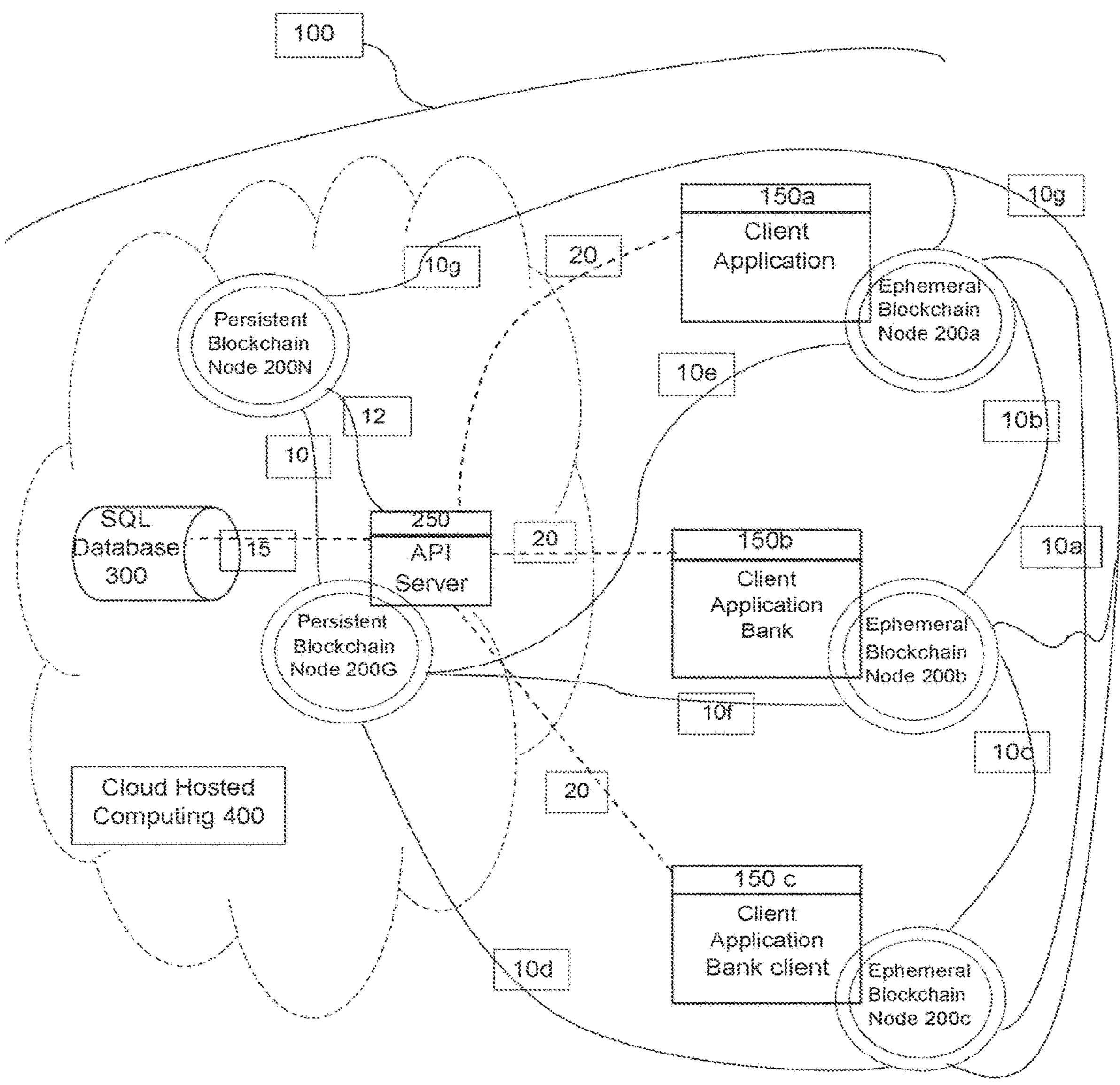
FIG. 1 is a block diagram demonstrating a preferred form distributed ledger system and method of the invention.

Referring to FIG. 1, a preferred form distributed ledger system 100 for creating, updating and maintaining one or more blockchains is shown. System 100 enables and supports a simpler and more secure and efficient systems deploying one or more blockchains as part of the system, The system 100 comprises an application server or server system API Server 250 having communication connections 20 with user node applications 150*a*, 150*b* and 150*c* which reside on user devices. The user node application is executable using a web instance or web browser instances operating on the user devices. The user node applications may be delivered via a WebAssembly software package provided with a software container or scaffold or interface that facilitates the following functionality: the App/container package being able to be downloaded from App stores for Android & Apple; the operation of the App in Client Devices having different operating environments/systems such as Android or Apple. In a broader context 150*a*, 150*b* & 150*c* may be referred to as client devices or user nodes or user identities.

The user node applications 150*a, b* & c each contain a synchronously operating fully operational blockchain node respectively 200*a*, 200*b*, 200*c* each of which are able to communicate freely with each other and others of said synchronously operating fully operational blockchain nodes on others of user devices and any others of synchronously operating fully operational blockchain nodes such as 200G and 200N connected to the API Server System 250. Each fully operational blockchain node is capable of performing blockchain related tasks or functions for managing an associated blockchain. Such tasks or functions can be loaded from memory associated with the server system 250 via a web instance. In some embodiments, the node applications may be loaded from an address location of a blockchain of the system.

Node 200N has communication connection 10 with API server system 250.

Communication connection 15 connects API Server System 250 with SQL Database system 300.

Communication connections 10*a* to 10*g* provide peer to peer communication capabilities between nodes 200*a*, 200*b*, 200*c*, 200E and 200N. Node 200N also shows yet another preferred embodiment whereby nodes may be provided with direct communication connection to each API server here shown is communication connection 12 between node 200N and API server system 250.

Preferably at least said API Server System 250 and SQL Database system 300 and nodes 200G and 200N are scalable and all reside within a public cloud computing environment 400.

The user nodes 150*a-c* are ephemeral in that they may temporarily join and participate in the management of the blockchain and then leave the network when the node application is terminated, such as when the associated web instance is terminated.

The user nodes 150*a-c* comprise at least one full node. Preferably multiple nodes are full nodes and most preferably each ephemeral node may be operated as a full node. Full nodes are capable of validating transactions on the associated blockchain. Full nodes are nodes that check that the chain follows the rules, and if a chain doesn't follow the rules. Some nodes of the system may not be full nodes, but may be operated as light nodes, such as SPV nodes or wallet nodes.

A full node verifies that all preceding blocks are valid in order to guarantee that a transaction is valid. Full nodes are the fundamental anchor of trustless security in a blockchain system.

A client verifies the depth D of a block by checking that there are D blocks after it (also called "confirmations"), all of which are well-formed. Light nodes don't verify the preceding blocks, they use the number of confirmations (whether they are valid or not) as a measure of the likelihood of a block chain reorganization producing a new longer fork which excludes the transaction.

In one preferred embodiment of the present invention, WebAssembly[1] is therefore utilised to run a full node[4] application through a web-browser instance.

WebAssembly provides a binary instruction format for a stack-based virtual machine running in a browser. In simple forms, WebAssembly allows us to compile high level languages into a byte-code format that can be executed by the browser in a secure virtual machine. WebAssembly thereby allows for increased node Complexity[5] by delivering the node as a part of an application compiled using WebAssembly. FIG. 1 represents a system including full node applications running via web-browser instances.

The present invention may be implemented using the .Net Standard (https://docs.microsoft.com/en-us/dotnet/standardlnet-standard), a formal specification of .Net APIs which allow for cross platform compilation and use. The user node application set may run in WebAssembly using the Blazor framework, for example. The software either runs in an interactive fashion, accessed as one would a traditional web application, but also may run as a service using Headless Chrome (https://developers.google.com/weblupdates/2017/04-/headless-chrome).

As shown in FIG. 1, the system 100 works in the following way:

1. Each user talks to each other user (peer to peer) using the blockchain protocols
2. Each user talks to the server using REST
3. The Server communicates with a Database
4. A .NET based distributed blockchain is central to the entire system. The payload of this blockchain is MSIL (Compiled .NET code). This key feature of compiled code embedded in the blockchain makes for an incredible array of utility from the platform including indications of much enhanced speed of execution compared to other blockchains.

The Server also communicates with the blockchain using the blockchain protocols.

Typically, the process of installing and running a blockchain node is beyond the reach of most consumers. In the present invention, a working node can be delivered without the user having to perform any additional actions to install software and set up node applications and without using extensive resources of their device. In this embodiment, each user node application uses the user device computing power and operates as any other node, but through a web instance of the node application. User nodes of this nature are therefore transient/ephemera/and may exist for seconds, minutes or hours but only operates whilst the application is in an active browser session. This makes the node transient, small, simple and relatively quick to initiate.

The term "web instance" or "web browser instance" as used herein also includes the concept of running in a web browser such as Internet Explorer or Google chrome or similar.

The system of the present invention may be utilised for cryptocurrency applications, for distributed applications, or to leverage a vast distributed computing platform.

Users of the system 100 may create accounts using an existing account at a known authentication provider such as Google, Microsoft or Facebook. Once their account is created, they are able to create a private/public key pair with which to sign blockchain transactions.

The system 100 may comprise one or multiple blockchains. Each blockchain contains blocks, which are written to the blockchain by a random peer. This node (which runs in the context of a user), may to be a paid subscriber to participate in blockchain maintenance, for example. In the preferred embodiment, a Proof of Stake process is utilised, such as described in https:J/en.wikipedia.orglwiki/Proof-of-stake. Proof of Work Mining may not be an appropriate determining factor for a random node in this context due to the increased computational power necessary to perform such a mining task.

As previously mentioned, user nodes are ephemeral in that they do not and are not expected to run permanently. A node may launch and exit before obtaining a full cache of the current blockchain epoch, i.e. the current iteration of a blockchain.

An exemplary blockchain structure utilised by the system 100 is shown in the table below.

| | Item Description |
|---|---|
| Index | Index of the current block |
| Nonce | Current Random Seed |
| Previous Hash | Hash of the Previous Block |
| Current Hash | Hash of this Block |
| Data[ ] | Array of byte[ ] containing MSIL |
| epoch | Current Epoch or iteration of this blockchain |

Each block in the blockchain is given a unique index which is incremented each time a new block is written to the chain. The Nonce is a randomised number, written by the last node to write the blockchain to help choose the next node to write a block. The Previous Hash is a Sha256 of the previous block. The Current Hash is a Sha256 of the current block. The Data [ ] is an array of one or more byte arrays containing unique .Net Standard partial objects (see objects below) The Epoch is the current iteration of the chain. Participating nodes requesting a copy of the chain always receive the current iteration of chain which may be an entire chain with all blocks from the beginning of the chain or such portion or epoch of the chain as may be specified in the rules of a particular blockchain.

Peer to peer communication between node applications of system 100 is preferably performed using WebRTC. WebRTC allows for peer nodes to communicate and run the network. The network is by user nodes which execute the following blockchain related tasks and functions:

1. New transactions are broadcast to all nodes.
2. Each node collects new transactions into a block.
3. Each node leverages a proof of stake.
4. When a node has an appropriate proof-of-stake, it broadcasts the block to all nodes.
5. Nodes accept the block only if all transactions in it are valid and not already spent.
6. Nodes express their acceptance of the block by working on creating the next block in the chain, using the hash of the accepted block as the previous hash. Nodes always consider the longest chain to be the correct one and will keep working on extending it. If two nodes broadcast different versions of the next block simultaneously, some nodes may receive one or the other first. In that case, they work on the first one they received, but save the other branch in case it becomes longer. The tie will be broken when the next proof-of-stake is found, and one branch becomes longer; the nodes that were working on the other branch will then switch to the longer one.

Transactions between user nodes may be .Net standard compliant software constructed as a partial class of a parent class. This code may be sent to the server as plain text and may be compiled into a byte array which is written to the blockchain and then can be executed by any node.

The .Net Standard libraries contain almost all that is needed to write any piece of software. .Net standard is also open source meaning the uniform set of Apis are available and should run anywhere. This makes the system equally content to run on a mobile device, computer and server. User node applications may be written in C# for example.

As the platform uses WebRTC as its core communication platform, it is also available for instant voice, text and video conversations the platform allows two users to instantly communicate, with the permission of both, to solve a merchant to consumer issue.

In the preferred embodiment, each blockchain of the system 100 may use for two specific types of transactions, token events and communication. Token events are those which cause a token to be sold, exchanged, created or moved. Communication is between two parties, is secure and contains json information. Communication is secured in a manner similar to secure instant messaging platforms such as Facebook Messenger or WhatsApp (In essence the Signal protocol).

The system 100 may not take any dependency on knowing the identity of a consumer (although merchants may). The system 100 allow anyone who can use a preferred identity providers to sign up and take their details at face value. This may not be the case in certain applications of the system 100, such as where fiat currency is moving. In this case, and to ensure regulatory acceptance, the system 100 may be implemented to formally identify the end user before allowing them to join and participate in the network. In other cases, the identity of the user may be anonymous.

Every user who joins the network generates a number of Public and Private key pairs for use by each node address associated with the user. Users can be in control of multiple addresses.

Users generate a Public/Private Key Pair to record their identity. It is the long-term identity key pair as defined in Open Whisper System's Signal Protocol[ii]

A user 'A' having employees or sub-contractors may create individual sub identities addresses for each person/entity identifiable both as individuals and employees/contractors of or relating to user 'A'.

On registration (or the addition of an address), a user can sign their address with their private key and submit it to the blockchain.

At the same time, users generate 100 key pairs to be used for communication. These are signed. The private keys of these are stored in the user's application storage. The public keys are submitted to the servers of the system 100 to be used whenever communication is initiated. These are the Open Whisper System's Signal Protocol Medium Key Pairs.

Upon the initiation of any message, the public keys are packaged as a key bundle and registered with the Go: Server.

For the User to initiate a communication with another user (or merchant), they need to request the user's key bundle from the server.

The Server acts as a directory (Key Distribution Center to Provide this)

For each conversation, an ephemeral key is provided and added to the transaction bundle. Using the Diffie Hellman algorithm[iii], only the recipient holding the correct key can ever decrypt the messages received.

Certain user types, such as merchants may be validated, to the extent that we can prove they are valid businesses, their corporate registration number matches that in the government databases and/or their addresses pass validation, for example. They then again work as users except:

1. The system may store a JSON Schema[iv] for each merchant of the information they require. For example, the following is an example of data sent to a merchant in a message.

```
{
"name": "My User Name",
"email": "test@test.com",
"account_number": 12345,
"NewCard"": "0000-0000-0000-0000",
"ExpiryDate": "01/01",
"CCV": "123",
}
```

2. Here is the response sent from the merchant:

```
{
"account_number": 12345,
"CardNum": "00xx-xxxx-xxxx-0000",
"status": "CardUpdated",
}
```

As these messages can only be decrypted by the intended recipient, even if they are intercepted, the data is transmitted and managed securely, and merchants can request any information they need to complete the transaction.

Node Groups

In some embodiments, a system of child or sub identities or sub nodes is provided for any node in a blockchain so the sub identities are also able to access the links to other nodes or sub nodes of the blockchain thereby allowing multiple specific persons/entities to be each authorized to a specific sub identity of a node or sub node to utilize the communication links to any other node such that the calling person and the call receiving person have certainty with whom it is that they are in communication. The system of child or sub identities or sub nodes may also be achieved by a Merchant node identity uploading to the server a list or map of node identities or keys which are part of a Merchant/User group.

Figure 2:
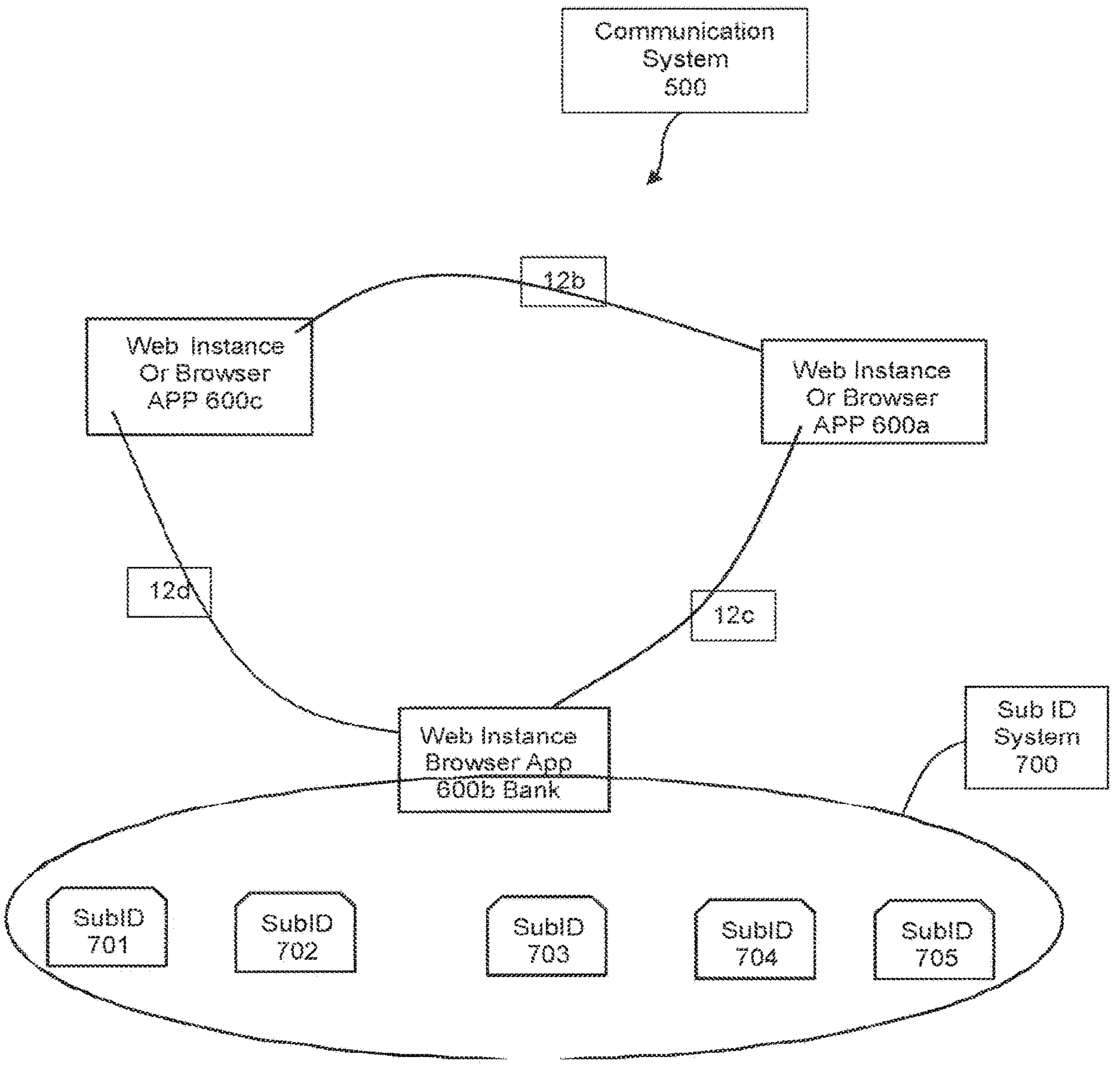
FIG. 2 is a block diagram demonstrating a preferred implementation of the distributed ledger system of FIG. 1 in which a group of users can connect to the. system.

FIG. 2 is a schematic view of a preferred embodiment of an improved computer architecture system enabling and supporting simpler more secure and efficient systems deploying one or more blockchains as part of the system and having a secure information voice video connection and communication transmission system.

Web instances of an App, 600*a*, 600*b*, 600*c* running on a user device such as a mobile phone, desktop computer, laptop, table etc. may require a two-factor authorisation including biometric validation to validate users of said Apps. The web browser instances of the said user node applications contain or are connected to a synchronously operating fully operational blockchain node (Not shown but similar to nodes 200*a*, 200*b*, 200*c* of FIG. 1)).

For simplicity because nodes are connected to or contained within the user node applications, we could also refer to 600*a*, 600*b* and 600*c* as synchronously operating fully operational blockchain nodes. Each node in direct secure communication with every other node and node 600*b*, which may be an entity such as a bank for example, having multiple sub-entities, such as employees, needing to communicate securely to other web-browser instances of user node applications. To facilitate mufti person access to the communication system there is provided a Sub Class 700 of child nodes 701,702,703, 704 & 705 having user addresses validated by the banks internal two Factor identification or bank's own employee identification system, for example, to use the communication/access parent node of Web Instance App 600*b* and communicate with any other nodes and Apps for example user nodes 600*a* and 600*c*. The child nodes have associated user addresses that include at least a portion of the user address of the parent node in this embodiment.

Use Cases

Various means of deploying the system 100 are envisaged. The following are examples.

In some implementations of the present invention especially where the user is not an individual person, it will be appropriate to validate the user as for any legal entity by the specified number of authorized Directors, Officers or Trustees etc. each having a valid Sub User Identity with 2 FactorAuth entry including bio identity check. This identity checking could be static in that once all directors have signed on for the first time with 2 Factor Auth including one Factor being biometric then no further checking is necessary. However, a more stringent validation would require that a quorum of the authorized identities Directors, Officers or Trustees be present and validated on the system.

Verification could be automatically conducted as a background task on any user with the system using local cameras for background bio-metric checking against data held in the system. Such ID verification on the fly may be an appropriate procedure when transactions are of a sensitive nature or of high value.

In another preferred instance, the present invention provides sub classes for ephemeral Nodes/links and facilitates communication between Sub Class.

Peers and provisions that an App associated with any node may store in the blockchain anything necessary to enable the App to deliver or conduct whatever service or thing it may be providing to users including communications and including executable code. Said storage in a single block may be a single compiled code object or more efficiently the block may hold an array of compiled code objects.

Another preferred instance of the present invention is a system and method of providing overarching security for one or more blockchains comprising; 2 or more block chains whereby for example blockchain A facilitates verification, input, storage, extraction and manipulation of data by user nodes; said data related to one or more commercial or other enterprise and Blockchain B is provided with large dataset Machine Learning (ML) capabilities to monitor the operation of Nodes on Blockchain A to determine behavior status of Nodes on blockchain A. Such monitoring by blockchain B comprises but is not limited to; developing through ML the ability to identify unusual behavior or activity patterns in operations and taking appropriate and timely action; detecting unusual behavior or activity in Nodes in a particular geographic areas or Nodes supported by a particular service provider or providers and behavior/activity of nodes supported by each service provider; external factors such as power outages may also be factored in to overall "health" assessment of the monitored one or more blockchain systems. Blockchain B may be considered as a security blockchain, but this security method and system may in other instances of the present invention be implemented to operate within and as a function of a single blockchain.

Another preferred instance of the present invention is a system and method of mapping user identities to provide for users wishing to have a simple system to facilitate moving between different blockchains offering various experiences and services comprising:

Creating 3 or more block chains whereby for example blockchain 'A' facilitates one or more of verification, input, storage, extraction and manipulation of data by user nodes, said data related to one or more commercial or other enterprise and Blockchain 'B' facilitates one or more of verification, input, storage, extraction and manipulation of data by user nodes, said data related to any desired educational or recreational or other purpose such as one or more of social network providers, games and associated environments providers and blockchain C facilitates verification of user nodes on blockchains A and B and maps a static node identity of each user on any of the block chains and presents said map in any known form such as a directory to users wishing to use nodes on any of the various blockchains available in its map of blockchains so that the User 'X' having a node/identity on Blockchain 'A' may select a desired blockchain environment they wish to visit as a user such as Blockchain 'B' and said blockchain C provides User 'X' with a node identity in said Blockchain 'B' which identity may be static in which case it is retained as allocated to correspond/link with user 'X''s identity in Blockchain 'A' so that users may have permanent addresses in all blockchains connected by the 'mapping' block chain C or said provision of a node identity may be a transient address which is discarded after use ceases In another preferred instance the present invention provides a system and method to provide for those users that seek total privacy to enable the issue of a static identity which only occurs once upon first signing in and joining a blockchain community and thereafter provides for any subsequent visits by the user to the block chain, different or virtual user node identities and separate new virtual identities for each transaction.

In another preferred instance the present invention provides a system and method of providing a fair value system for tasks or services performed in or by Apps operating in or on blockchains by tracking and publishing blockchain crypto currency-coin value equivalents of real world; actual tasks or services performed by Apps operating in or on a blockchain in this example blockchain 'A' said system and method comprising; listing offers, expressed in fiat currency or currencies, of tasks or services by one or more Apps to users; aggregating the offers for each task or service and calculating a mean price of said task or service for each app; tracking crypto currency exchange posted prices of sales of or mean of bids and offers of fiat currency or currencies exchange rate for a crypto currency 'A' and determining the mean value of bids and offers and or sales from multiple crypto currency exchange service providers; publishing daily the value of tasks or services provided in or by Apps expressed in crypto currency 'A' by multiplying the mean of each fiat currency exchange rate to crypto currency 'A' by the mean price in fiat currency of each task or service offered. In another preferred instance the present invention provides a system and method of providing a fair value signal for tasks or services performed in or by Apps operating in or on blockchains said system and method comprising; training a machine learning app or process to read every transaction of every task or service conducted on or in a blockchain, in this example blockchain 'B' over the course of a period such as one day or one week; read and predict the most likely trading range of fiat currencies exchange rate with a blockchain crypto currency of blockchain 'B'; publishing daily the value of tasks or services provided in or by Apps expressed in crypt ( ) currency 'B' by publishing the price in fiat currency of each task or service offered having the highest probability determined by the machine learning process or app.

Benefits

Due to the unique architecture of the platform as described in this document, end users are easily able to either write applications for the platform or have the ability to scale the platform and integrate it with their existing systems.

Due to the "platform" nature of the system 100, the opportunities for the platform are innumerable, however below is a set of key initial scenarios:

1. Easy update of credit card details across providers and subscriptions
2. Implementation of a simple cryptocurrency with inbuild merchant and purchaser support.
3. Instant peer to peer payments
4. Delivery of distributed applications While there has been shown and described at least one preferred embodiment of an Improved computer architecture supporting simpler and more secure blockchains, it will be appreciated that many changes and modifications may be made therein without, however, departing from the essential spirit thereof.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine-readable mediums for storing information. The terms "machine readable medium" and "computer readable medium" include but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied in a software module executable by a processor in the form of programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, as a business method, and/or combination thereof.

In its various aspects, the invention can be embodied in a computer-implemented process, a machine (such as an electronic device, or a general-purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

REFERENCES 1. https://webassembly.org/
2 https://msdn.microsoft.com/en-us/magazine/dn463786.aspx
3 https://hbr.org/2017/03/how-safe-are-blockclains-it-depends
4 https://bitcoinmagazine.com/articles/you-really-should-run-full-bitcoin-node-heres-why/
5 https://www.techradar.corn/au/how-to/how-to-run-a-full-bitcoin-node
i Bitcoin: A Peer-to Peer Electronic Cash System by Satoshi Nakamoto
ii https://en.wikipedia.orgiwiki/Open_Whisper_Systems
iii New Directions in Cryptography. Diffie, Whitfield, Hellman, Martin E November 1976
iv https://json-schema.org/
R. C. Merkle "Protocols for public key cryptosystems" In Proc. 1980 Symposium on Security and Privacy, IEEE Computer Society, pages 122-133, April 1980
Winston W Royce "On the Development of Large Scale Computer Systems" 1970 Presentation to the IEEE A Formal Security Analysis of the Signal Messaging Protocol (Cohn Gordon, Cas Cremers, et al, 2016) Demystifying the Signal protocol for End to End Encryption (E2EE).

All publications, patents, patent applications and other documents cited in this application are incorporated by reference in their entirety for all purposes to the same extent as if each individual publication and/or other document were individually indicated to be incorporated by reference for all purposes.

The invention claimed is:

1. A distributed ledger system comprising:

a network of computing devices including at least one group of user nodes in communication with one another to participate in transacting and recording transactions in an associated blockchain, at least one user node in the group being initiated and operable via an instance of one or more web-application(s) running in a web-browser executed by one or more associated computing device(s), the web-application(s) being configured to initiate and operate an associated user node to participate in transacting and recording transactions for at least one blockchain of at least one group of user nodes by:

obtaining a node address for the associated user node for each blockchain that the user node is configured to participate in, the node address including an indication of the associated blockchain;

requesting data indicative of a current iteration of the blockchain from the group of user nodes and storing the current iteration of the blockchain in electronic memory of the computing device(s) associated with the user node, for at least one blockchain that the user node is configured to participate in; and enabling the associated user node to:

communicate with the group of user nodes to participate in transactions with the group of user nodes, for at least one blockchain that the user node is configured to participate in, and carry out one or more blockchain-related tasks including creating, updating and/or maintaining the blockchain based on the transactions between the group of user nodes, for at least one blockchain that the user node is configured to participate in; and wherein the network of computing devices enable at least one ephemeral user node of at least one group of user nodes to temporarily join and operate within the group of user nodes by initiating a temporary instance of the respective web application(s), the blockchain(s) associated with the group of user nodes remaining active after the temporary instance of the respective web application(s) is terminated.

2. The system as claimed in claim 1 wherein the network of computing devices is operable to enable the at least one ephemeral user node to temporarily join and operate within the group of user nodes and to rejoin and operate within the group of user nodes during multiple independent instances of the respective web application(s).

3. The system as claimed in claim 1 wherein the at least one user node in at least one of the group(s) of user nodes is configured to communicate with the network of computing devices to obtain executable code using an address location within a blockchain of the system.

4. The system as claimed in claim 1 wherein the networking of computing devices includes a server and a database, and the at least one user node in at least one of the group(s) of user node is configured to access and execute the blockchain related tasks by communicating with the server and or a database.

5. The system as claimed in claim 1 wherein at least one ephemeral user node is a full-node operable to execute a mining task of the blockchain-related tasks for selecting a node within the associated group of user nodes to write a next validated block to the associated blockchain.

6. The system as claimed in claim 5 wherein the mining task is operative using a proof-of-stake method.

7. The system as claimed in claim 1 wherein the user nodes of at least one of group(s) of user nodes are capable of communicating with one another via a peer-to-peer communications protocol.

8. The system as claimed in claim 1 wherein the network of computing devices is configured to verify a predetermined user identity associated with a user node prior to the user node establishing communication with the remaining user nodes in a group of user nodes, for the purposes of carrying out one or more blockchain-related tasks.

9. The system as claimed in claim 1 wherein the at least one ephemeral user node is configured to obtain a new node address different to a previous node address for an associated blockchain when the node re-joins a group of user nodes.

10. The system as claimed in claim 1 wherein the at least one user node of at least one of the group(s) of user nodes includes a unique node address for each blockchain associated with the node.

11. The system as claimed in claim 1 wherein the network of computing devices is configured to provide and associate at least one private/public key pair to a user of a node address for use in encrypting and decrypting transactions associated with a user of a blockchain upon the associated node joining the network for the purposes of participating in the blockchain.

12. The system as claimed in claim 1 wherein the network of computing devices are operable to create, update and maintain multiple blockchains.

13. The system as claimed in claim 1 wherein each user node in at least one of the group(s) of user nodes is associated with a user identification or address containing an indication of the blockchain and wherein the user identification or address is utilised in transactions associated with the user node to identify the associated user.

14. The system as claimed in claim 1 wherein the transactions between the group of user nodes comprises an exchange of data including any combination of one or more of: text data, image data, audio data and/or video data.

15. The system as claimed in claim 1 wherein at least one user node in at least one of the group(s) of user nodes is configured to obtain a parent node address and at least one other user node in the group of user nodes is configured to obtain a child node address that includes data indicative of the parent node address.

16. The system as claimed in claim 15 wherein at least one user node of at least one of the group(s) of user nodes is operative to require authorisation of a transaction from one or more other user nodes within a group of parent and child nodes prior to broadcasting the transaction for recording on the associated blockchain.

17. The system as claimed in claim 16 wherein the at least one other user node within the group of parent and child user nodes is operative to authorize a transaction from the at least one user node prior to broadcasting the transaction for recording on the associated blockchain.

18. The system as claimed in claim 1 wherein the network of computing devices is configured to allocate a static user identify to each user node in at least one of the group(s) of user nodes upon joining the group of user nodes for the first time.

19. The system as claimed in claim 18 wherein the network of computing devices is configured to allocate a new virtual user identity differing from the static user identify to each of the at least one ephemeral nodes in at least one of the group(s) of user nodes every time the ephemeral user node rejoins the network of computing devices.

20. A method for maintaining at least one blockchain stored in a distributed ledger system, the method comprising:

enabling communication between a network of computing devices including at least one group of user nodes in communication with one another to participate in transacting and recording the transactions in an associated blockchain, enabling at least one user node in at least one of the group(s) of user nodes to be initiated and operable via an instance of one or more web-application(s) running in a web-browser executed by one or more associated computing device(s), the web-application(s) being configured to initiate and operate an associated user node to participate in transacting and recording transactions for at least one blockchain of at least one group of user nodes by:

obtaining a node address for the associated user node for each blockchain that the user node is configured to participate in, the node address including an indication of the associated blockchain;

requesting data indicative of a current iteration of the blockchain from the group of user nodes and storing the current iteration of the blockchain in electronic memory of the computing device(s) associated with the user node, for at least one blockchain that the user node is configured to participate in; and enabling the associated user node to:

communicate with the group of user nodes to participate in transactions with the group of user nodes, for at least one blockchain that the user node is configured to participate in, and carry out one or more blockchain-related tasks including creating, updating and/or maintaining the blockchain based on the transactions between the group of user nodes, for at least one blockchain that the user node is configured to participate in; and enabling at least one ephemeral user node of at least one group of user nodes to temporarily join and operate within the group of user nodes by initiating a temporary instance of the respective web application(s), the blockchain(s) associated with the group of user nodes remaining active after the temporary instance of the respective web application(s) is terminated.

* * * * *